United States Patent [19]
Kelley

[11] 4,310,215
[45] Jan. 12, 1982

[54] STABLE ULTRAVIOLET CHEMICAL FILTER

[75] Inventor: Lawrence R. Kelley, Redondo Beach, Calif.

[73] Assignee: The United States of America as represented by the Secretary of the Air Force, Washington, D.C.

[21] Appl. No.: 149,793

[22] Filed: May 14, 1980

[51] Int. Cl.³ .............................................. G02B 5/24
[52] U.S. Cl. ...................................... 350/1.5; 250/510
[58] Field of Search ................. 350/1.5, 312; 250/510

[56] References Cited

U.S. PATENT DOCUMENTS

| 1,569,973 | 1/1926 | Goettert | 350/312 |
| 1,681,276 | 8/1928 | Bell | 350/312 |
| 3,596,125 | 7/1971 | Seigel | 350/312 X |
| 3,675,477 | 7/1972 | Allen | 350/1.5 |
| 3,914,010 | 10/1975 | Zeller | 350/312 X |
| 4,064,402 | 12/1977 | Posnansky | 250/504 |

OTHER PUBLICATIONS

Kasha, M., "Transmission Filters for the Ultraviolet", J.O.S.A., vol. 38, No. 11, Nov. 1948, pp. 929-934.
Calvert, J. G. et al., *Photochemistry*, pp. 728-755, John Wiley & Sons, N.Y.
*Photophysiology*, edited by Giese, A. C., vol. III, Chapter 1, pp. 1-32.

*Primary Examiner*—John K. Corbin
*Assistant Examiner*—Bruce Y. Arnold
*Attorney, Agent, or Firm*—Donald J. Singer; William J. O'Brien

[57] ABSTRACT

A liquid chemical filter for suppressing the heat producing portion of the solar spectrum emanating from a simulated solar source and composed of a mixture a hydrochloric acid, cobalt sulfate and distilled water positioned between two ultraviolet transmitting fused silica windows.

3 Claims, 5 Drawing Figures

STABLE ULTRAVIOLET CHEMICAL FILTER

STATEMENT OF GOVERNMENT INTEREST

The invention described herein may be manufactured and used by or for the Government for governmental purposes without the payment of any royalty thereon.

BACKGROUND OF THE INVENTION

This invention relates to a liquid filter especially adaptable for suppressing infrared radiation. In a more particular manner, this invention relates to an ultraviolet light liquid chemical filter for use in suppressing and removing the excess heat, or infrared radiation, from a beam of light radiating from a simulated solar light source while simultaneously allowing the passage of ultraviolet radiation through the filter.

The present utilization of earth orbiting satellites, as well as other space vehicles and systems contemplated for use in the future, has generated considerable interest in establishing test and evaluation procedures for the materials used in their manufacture. These space vehicles often require the use of flexible, thin film materials on their external surfaces. Such materials are often employed as coverings in thermal control systems or as the principal operating component for devices which inflate, unfurl or otherwise expand during operation.

An important factor which must be considered by those using these thin film materials as structural components is the potential damage which can occur from natural space radiation. The physical and chemical properties and characteristics of the film can be seriously altered thereby affecting the operational efficiency of the space vehicle. This situation is compounded by the fact that the mean mission lifetime of space systems is increasing from 1 to 3 years for earlier spacecraft to 5 to 10 years for present and future spacecraft. Some requirements may even go as high as 30 years.

The critical space radiation environment consists primarily of solar ultraviolet radiation and charged particles (electrons and protons) which can cause both surface and bulk damage to the materials. The effects of space radiation on the properties of metals and inorganic materials are usually small. However, organic materials, like polymer films and adhesives, are subject to a wide range of radiation degradation effects depending on the molecular structure of the material and the quantity of energy absorbed from the radiation sources. The resulting formation of free radicals and ions in the material lead to cross-linking, chain scission, chain polymerization, block copolymerization, unsaturation, and chain transfer.

Typical manifestations of this energy interaction and deposition within the organic materials include outgassing (and contamination of surrounding surfaces), shrinkage, cracking, crazing, pitting, embrittlement, and discoloration. These cause degradation of useful mechanical properties such as tensile strength, elongation, and modulus of elasticity and degradation of important optical and thermophysical properties such as transmittance, reflectance, and solar absorptance.

Most of the accumulated radiation dosage near synchronous altitude is considered to be low energy and thus is absorbed in the surface of the material ($<0.1$ mil penetration depth). Total surface dosage can be quite high—between $10^9$ to $10^{12}$ rads. For bulk penetration (0.1- to 10-mil depth), the absorbed dosage is between $10^8$ to $10^9$ rads. By contrast, threshold levels for incipient radiation damage in polymer films is on the order of $10^5$ to $10^8$ rads. In most applications, total thickness of the polymer films is in the one to 10 mil range; thus, a substantial fraction of the material is affected by the absorbed energy due to the synchronous radiation environment.

Therefore, it is extremely important that the critical properties and characteristics of these thin film materials, as altered or affected by long term exposure to the radiating environment of space, be fully understood. Otherwise, the proper evaluation of thin film materials for potential use within a space environment would be extremely difficult to say the least. The potentiallity for change in their physical and chemical characteristics must be known and evaluated for design purposes.

One particular problem associated with the use of thin filming materials concerns itself with the ability of these materials to withstand the degradative effects of ultraviolet light radiation which occurs on exposure to sunlight. In order to ascertain the degree of resistance to ultraviolet light, tests have been devised that simulate exposure to solar radiation. However, attempts at speeding up the testing procedure have proven to be unfruitful since the incident radiation resulting from accelerated testing procedures is at a much higher solar flux level than exists under actual operating conditions. This condition, unfortunately, causes the materials to heat up excessively and thereby disguises their true response to the effects of radiation and provides the test analyst with misleading information. The overheating is caused by the visible and infrared portions of the solar spectrum. Damage inflicted on the thin film material, however, results largely from ultraviolet radiation. Accordingly, an optimum testing procedure would be one which reflects or rejects the heat producing portion of the spectrum while, at the same time, allowing a major proportion of the ultraviolet portion to impinge upon a test sample in order to determine the sample's resistance to ultraviolet light degradation. In other words, interposing a proper filter between a source of solar radiation and the test sample could eliminate the undesirable heating effects.

In attempting to provide a solution to the problems associated with ultraviolet radiation resistance testing, it was found that a cobalt sulfate liquid filter having a path length of about 10 cm provided an effective means for eliminating much of the undesired heat produced from a solar or simulated solar radiation source during materials testing programs.

SUMMARY OF THE INVENTION

The present invention concerns itself with a chemical filter especially adapted to filter out the heat producing portion of the solar spectrum generated during testing procedures designed to simulate exposure to solar radiation. The filtering device comprises a liquid filtering material positioned between two quartz windows with a path length of about 10 cm. The filtering material comprises a mixture of distilled water, cobalt sulfate and hydrochloric acid. The device is utilized by placing it between a simulated solar radiation source such as a xenon lamp, and a sample of material to be tested for its resistance to degradation by ultraviolet radiation. The filter effectively excludes a major amount of the heat producing infrared radiation emanating from the xenon lamp. This permits a more accurate and reliable analysis of the test data produced during accelerated test procedures and provides the means for designing thin film flexible materials which can be utilized as structural elements for satellites and other space operational vehicles.

Accordingly, the primary object of this invention is to provide a means for removing and overcoming the damaging effects of heat which arise during the accelerated testing of thin film materials for their resistance to ultraviolet radiation.

Another object of this invention is to provide a means which can be interposed between a simulated solar radiation source and a test sample for filtering out the heat portion of the solar spectrum.

Still another object of this invention is to provide a bandpass, liquid cobalt sulfate filter particularly adapted for suppressing the infrared radiation emanating from a simulated source of solar radiation.

The above and still other objects and advantages of the present invention will become more readily apparent upon consideration of the following detailed disclosure thereof when viewed in conjunction with the accompanying drawing.

DESCRIPTION OF THE PREFERRED EMBODIMENT

With the above-mentioned and other objects in mind, the present invention contemplates a new and improved liquid filter for removing the heat producing radiation or infrared portion of the solar spectrum emanating from a simulated solar radiation source. For certain applications, flexible, thin film materials must be able to withstand long term exposure to sunlight. However, resistance to the ultraviolet portion of the solar spectrum, rather than the visible or infrared portions, is of greater importance for structural design purposes. In order to ascertain this capability, tests are devised that simulate exposure to solar radiation; but, in accelerating the testing procedure, the incident radiation is at higher solar flux level than exists under actual operating conditions.

Unfortunately, the higher flux levels cause the materials to heat excessively and, thereby, disguise their true response to the ultraviolet radiation. The overheating is caused by the visible and IR portions of the solar spectrum, while material damage is caused largely by the UV. Therefore, the optimum test instrument would be one that reflects or rejects the heat-producing portion of the spectrum and allows a large portion of the UV to reach the test sample. In other words, interposing selected filters between the source of the solar radiation and the test material would eliminate the undesirable heating effects.

Unfortunately, the filter devices suggested heretofore have not proven to be successful in providing the type of test conditions required to properly evaluate the ultraviolet light resistance of thin film materials. As a consequence, a considerable research effort evolved in an attempt to provide proper filtering devices. As a result of this effort, it has been found that a liquid filtering material having a particular compositional content and a path length of about 10 cm when placed between two ultraviolet grade quartz windows, provides a filtering device that overcomes the excessive heating problems now encountered in ultraviolet light resistance testing procedures.

Bandpass filters based on organic or inorganic dyes and multilayer interference techniques are well known. These filters, however, have short lifetimes. Distilled water has been used also with some measure of success, as has a mixture of distilled water and various sulfates. However, with this invention it was found that by adding a small quantity (100 drops per liter) of 37.5% hydrochloric acid to a cobalt sulfate solution, long-term effects were produced making the filter unexpectedly desirable for use in tests which simulate the effects of solar flux on materials. To be more specific, a filtering medium comprised of a mixture of 10 grams of cobalt sulfate and 100 drops of 37.5% hydrochloric acid per liter of water has proven to be especially suitable for testing purposes.

Figure 1:
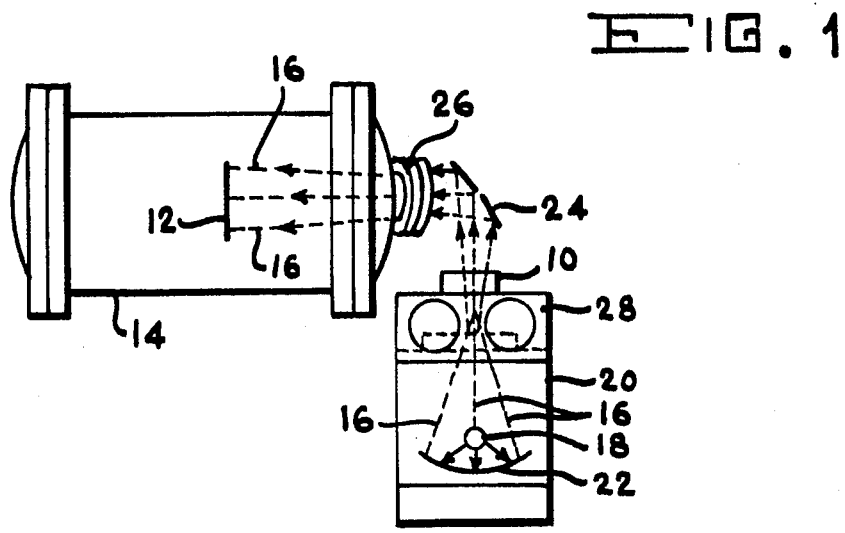
FIG. 1 is a schematic view of an ultraviolet radiation simulation testing system.
Figure 2:
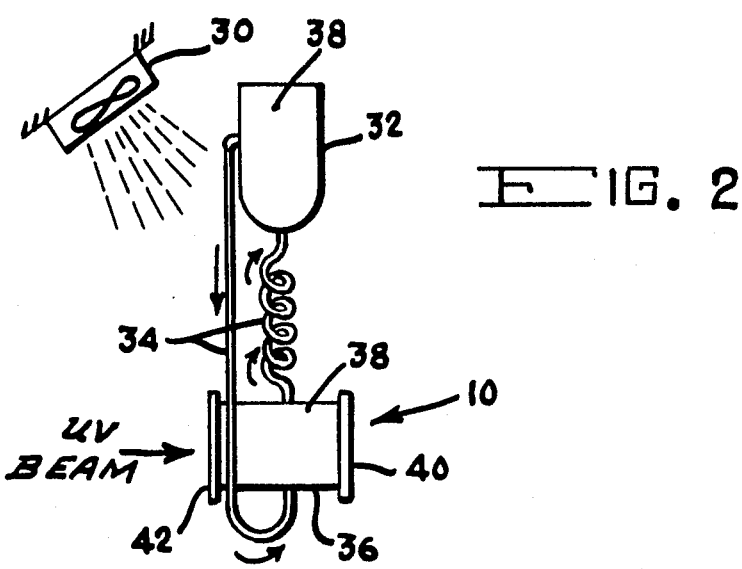
FIG. 2 is a schematic view of a liquid filter system utilizing the liquid filter device of this invention.

The liquid filter of this invention and its application in ultraviolet light resistance testing procedures is further described in the accompanying drawings. FIG. 1 shows an ultraviolet radiation simulation system for utilizing the cobalt sulfate liquid thermal filter 10 of this invention. It comprises a target sample 12 positioned within a vacuum/irradiation chamber 14. Dashed lines 16 represent an ultraviolet beam which comes from a 3 KW xenon lamp 18 positioned within a lamp housing 20. The beams 16 reflect off a beam concentrating mirror 22 and are directed through the cobalt sulfate liquid transmitting filter 10 to a split planar mirror assembly 24 to bind and create a more uniform beam. The beam 16 enters the front of the chamber 14 through a four inch diameter UV transmitting Suprasil fused silica window 26. The window material is the same material used for the quartz windows 40 and 42 of the filter 10 as more particularly shown in FIGS. 2 and 3.

The quartz window material is very stable under ultraviolet radiation and has a transmittance (including reflection losses) of 0.90 to 0.95 over the wavelength of 1800 to 20,000 Å.

The xenon lamp was selected over other lamps to simulate the solar ultraviolet spectrum because of its excellent spectral match of the solar spectrum. It has the disadvantage, however, of having a smaller fraction of its total energy output over the UV region (1800 to 4000 Å) than the other sources. Approximately 9 percent of the sun's energy is over this wavelength region but only 4 to 6 percent of the xenon lamp's energy is at these wavelengths. Hence, the xenon lamp generates approximately two "thermal suns" for every UV sun. Other lamp sources produce more UV and less infrared energy than the xenon sources; however, the UV energy is concentrated in narrow spectral bands and the aging characteristics are much more severe at the required high acceleration rates. Therefore, the xenon lamp is preferred over the other lamps. This requires, however, that a positive method be used to cool the beam prior to illuminating the specimens. This is accomplished by using the liquid filter system of this invention.

To more effectively keep the heat content of the energy away from the test sample 12 the liquid in the filter 10 should be cooled. Thus, a simple cooling system 28 above the filter 10 provides such a function. The cooling system 28 is disclosed in more detail in FIG. 2. It comprises a cooling fan 30, a pyrex glass cooling reservoir 32 with glass conduits 34 for circulating the cobalt sulfate liquid filtering material from the reservoir 32 to the filter 10.

Figure 3:
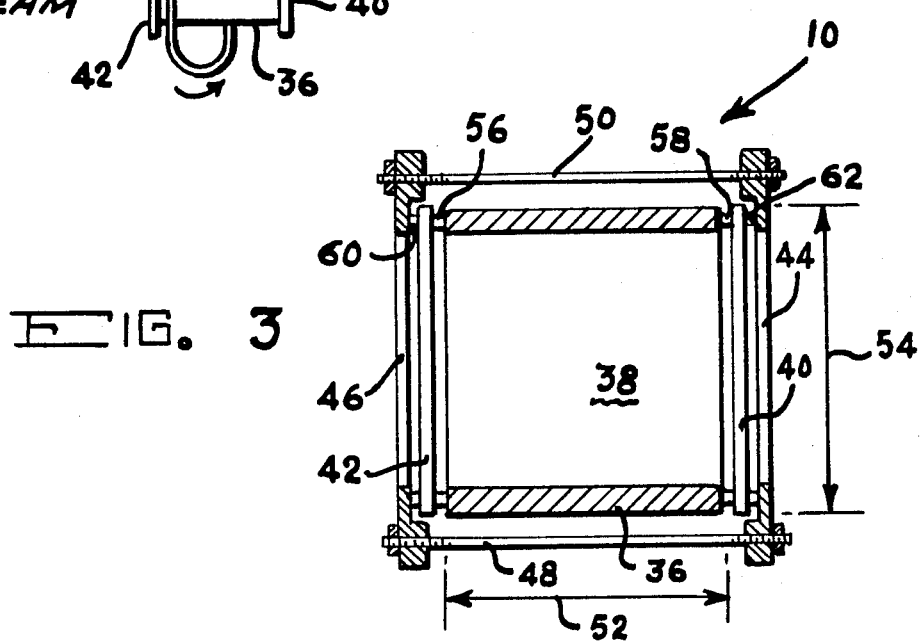
FIG. 3 illustrates schematically a typical arrangement of the filter of this invention.

FIG. 3 discloses a convenient and practical form for fabricating the filter device 10 of this invention. It consists of a pyrex glass cylindrical body 36 which contains the liquid cobalt sulfate filtering medium 38. The cylinder 36 is closed on both ends by means of two, 0.35 inch thick, Suprasil quartz glass windows 40 and 42. Thin flat gaskets 56 and 58 made from 0.025 inch thick silicone rubber provide a liquid-tight seal between the windows 40 and 42 and the cylinder 36. The fused quartz windows 40 and 42 are held in place by window retaining rings 44 and 46 and retaining bolts 48 and 50 to provide a path length of about 10 cm as indicated by arrow 52. A second set of silicone rubber gaskets 60 and 62 provide a soft seal between the retaining rings 44 and 46 and the windows 40 and 42. The windows 40 and 42 are about four inches in diameter as indicated by arrow 54.

The reservoir 32 and cylinder 36, contain the mixture 38 composed of distilled water, cobalt sulfate and hydrochloric acid. Since the filtering solution is in contact with only pyrex glass, fuse silica, and a small area of silicone rubber, and no metal contacts the acidic filtering fluid, contamination due to any adverse chemical reaction with the container is virtually eliminated. Also, the addition of hyrochloric acid to the cobalt sulfate filtering medium, in accordance with this invention, was found to be effective in cleaning the all-glass cells in which the solutions are prepared and irradiated with ultraviolet rays. The acid apparently dissolves the dark precipitate which normally forms during ultraviolet light irradiation. The acid does not reduce the initially high UV transmittance, no precipitate forms during the exposure and the UV transmittance remains high. The acidified solution is found to remain high in UV transmittance after several weeks of accelerated UV exposure.

Figure 4:
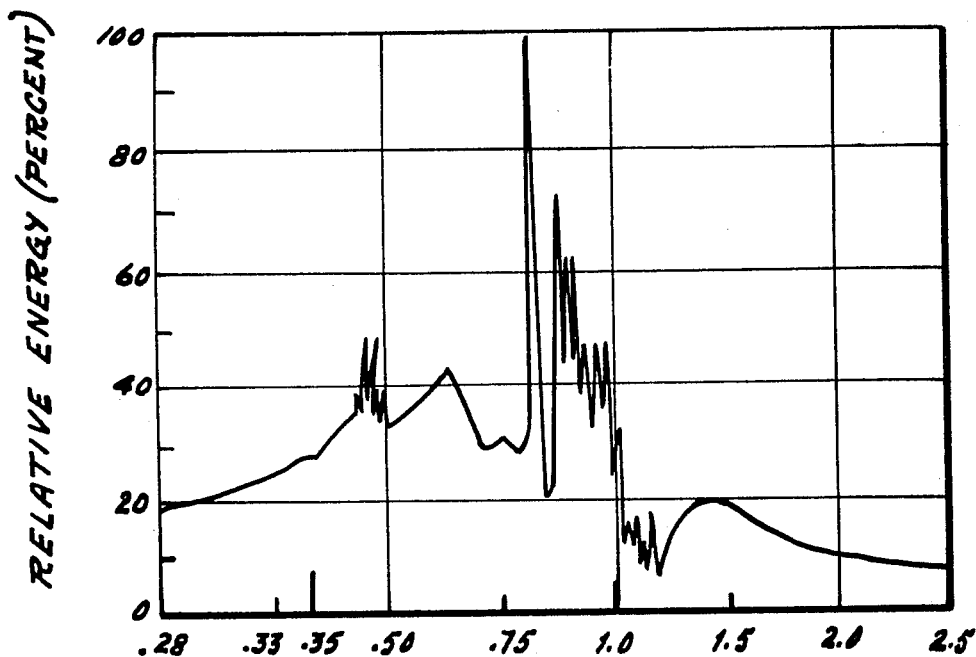
FIG. 4 discloses in graphical form the relative spectral energy of a typical xenon solar simulator.
Figure 5:
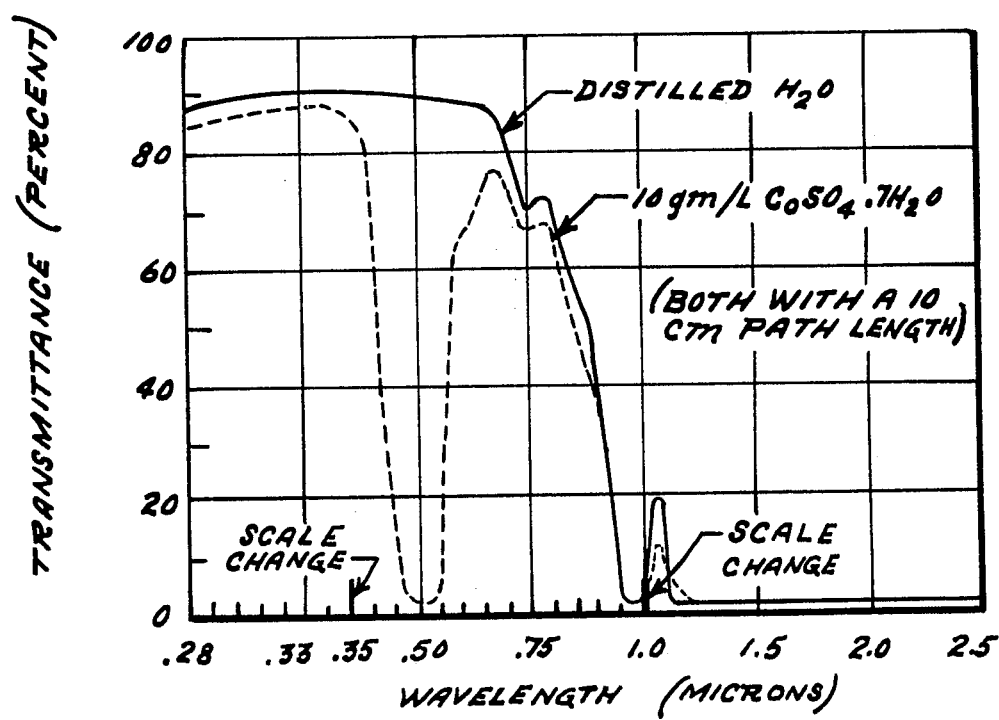
FIG. 5 discloses a graphical illustration of the spectral transmittance of the cobalt sulfate filter of this invention.

Distilled water has been known and used as filtering medium because of its high UV transmittance and low infrared transmission. However, beyond 7000 Å water tends to lose its transmittance proportion such that, by 9500 Å, water is less than 0.05 transmitting. Tests were conducted to determine the overall spectral transmittance of a 10 cm thick water filter using Suparsil fused silica windows as compared to a filter using the cobalt sulfate filter of this invention. Results of these tests are illustrated graphically in FIG. 5. The relative spectral energy of a typical xenon solar simulator is shown in FIG. 4 for reference purposes.

From a consideration of the above, it can be seen that the present invention provides the means for providing a suitable simulator of the space environment, permits simultaneous irradiation of a large quantity of test specimens and allows in situ evaluation of space radiation effects.

Although the invention has been described in detail by reference to a specific embodiment thereof it should be understood by those skilled in the art that various alterations and modifications of this invention can be made without departing from the spirit of the invention, the scope of which is defined by the appended claims.

What is claimed is:

1. A stable, ultraviolet, liquid chemical filter for suppressing the heat producing light rays emanating from a simulated solar radiation source comprising:
   a. A glass cylinder having ultraviolet transmitting fused silica windows positioned on each end of said cylinder and oppositely disposed from one another to form an enclosed chamber; and
   b. a liquid filtering medium positioned within said chamber between said oppositely disposed quartz windows and composed of distilled water, cobalt sulfate and hydrochloric acid.

2. A liquid filter in accordance with claim 1 wherein said oppositely disposed windows are positioned to form a filtering path length of about 10 cm.

3. A liquid filter in accordance with claim 2 wherein said liquid filtering material consists essentially of a mixture of about 100 drops of a 37.5 percent hydrochloric acid solution and about 10 grams of cobalt sulfate dissolved in a liter of distilled water.

* * * * *